United States Patent [19]

Huebl et al.

[11] 4,383,520

[45] May 17, 1983

[54] APPARATUS FOR THE INDEPENDENT ROTATION OF AN AGGREGATE ABOUT TWO AXES WHICH ARE POSITIONED PERPENDICULARLY TO ONE ANOTHER

[75] Inventors: Julius Huebl, Munich; Johann Eichinger, Vaterstettan, both of Fed. Rep. of Germany

[73] Assignee: Carl Hurth Maschinen-und Zahnradfabrik, Munich, Fed. Rep. of Germany

[21] Appl. No.: 201,843

[22] Filed: Oct. 29, 1980

[30] Foreign Application Priority Data

Oct. 31, 1979 [DE] Fed. Rep. of Germany ....... 2943944

[51] Int. Cl.³ .......................... F24J 3/02; F16H 47/00
[52] U.S. Cl. .................... 126/424; 126/438; 350/289; 353/3; 74/665 N; 74/416
[58] Field of Search ............... 126/424, 425, 438, 440; 353/3; 350/83, 289; 74/665 N, 665 L, 416

[56] References Cited

U.S. PATENT DOCUMENTS

| 395,002 | 12/1888 | Saegmuller | 350/83 |
|---|---|---|---|
| 497,079 | 5/1893 | Severy | 126/438 X |
| 2,095,207 | 10/1937 | Walter | 74/768 |
| 2,182,222 | 12/1939 | Courtis et al. | 126/424 |
| 2,646,720 | 7/1953 | Poliansky | 126/424 X |
| 2,802,320 | 8/1957 | Nagle | 74/660 X |
| 2,896,476 | 7/1959 | Williams | 353/3 X |
| 2,905,069 | 9/1959 | Ayres et al. | 74/665 N X |
| 3,201,106 | 8/1965 | Lafay | 74/665 N X |
| 3,305,686 | 2/1967 | Carter et al. | 126/425 |
| 3,466,119 | 9/1969 | Francia | 126/438 X |
| 3,901,104 | 8/1975 | Sims | 74/769 |
| 3,952,613 | 4/1976 | Iijima | 74/769 |
| 3,996,917 | 12/1976 | Trihey | 126/438 X |
| 4,003,274 | 1/1977 | Hirtsreter | 74/768 |
| 4,100,915 | 7/1978 | Carlson | 126/425 |
| 4,137,897 | 2/1979 | Moore | 126/424 |
| 4,139,286 | 2/1979 | Hein et al. | 353/3 |
| 4,141,626 | 2/1979 | Treytl et al. | 250/289 X |
| 4,179,612 | 12/1979 | Smith | 126/425 |
| 4,202,321 | 5/1980 | Volna | 353/3 X |
| 4,205,661 | 6/1980 | Chapman | 126/425 |
| 4,215,410 | 7/1980 | Weslow et al. | 126/424 |
| 4,227,513 | 10/1980 | Blake et al. | 126/438 X |
| 4,252,107 | 2/1981 | Horton | 126/438 |
| 4,290,411 | 9/1981 | Russell | 126/425 |
| 4,295,462 | 10/1981 | Bunch | 126/438 X |

FOREIGN PATENT DOCUMENTS

| 1156873 | 5/1958 | France | 353/3 |
|---|---|---|---|
| 1278188 | 10/1961 | France | 126/424 |
| 1438108 | 3/1976 | United Kingdom | 74/768 |

*Primary Examiner*—Larry Jones
*Attorney, Agent, or Firm*—Flynn, Thiel, Boutell & Tanis

[57] ABSTRACT

Apparatus for rotation of an aggregate independently about two mutually perpendicular axes, in particular for tracking solar collectors. A stationary first drive mechanism includes a housing, an electric motor, a multi-stage planetary gear set, a spur-gear stage and a driven shaft. A rotatable second drive mechanism includes a housing carried at the free end of the driven shaft of the first drive mechanism. The second drive mechanism further includes an electric motor, a multi-stage planetary gear set, a spur-gear stage and a driven shaft. The driven shaft of the second drive mechanism is directed perpendicular to the driven shaft of the first drive mechanism and carries at its ends the aggregates to be rotated.

10 Claims, 5 Drawing Figures

APPARATUS FOR THE INDEPENDENT ROTATION OF AN AGGREGATE ABOUT TWO AXES WHICH ARE POSITIONED PERPENDICULARLY TO ONE ANOTHER

FIELD OF THE INVENTION

The invention deals with an apparatus for the independent rotation of an aggregate about two axes which are positioned perpendicularly to one another.

BACKGROUND OF THE INVENTION

In systems for utilizing solar energy, the collectors (heliostats), which are composed of several individual elements in large flat aggregates, are adjusted in their position constantly to track the continually changing position of the sun in order to achieve highest possible efficiency. In one conventional system, the collectors are mounted pivotally about a horizontal axis on a frame, which frame is supported rotatably about a vertical axis by several wheels on a rail laid in a closed circle. However, the structural complexity and cost for the frame and the rail, which must be laid very exactly, can be justified only in very large systems. It is also necessary in such a system to constantly rotatingly readjust the collectors, both about the vertical axis and—independently therefrom—also about the horizontal axis. However, Applicants have recognized as more advantageous an arrangement of a first axis at least approximately directed toward the sun, since then the collectors need be rotatingly readjusted only about a second axis perpendicular to the first axis, while readjusting of the first axis is necessary only from time to time.

Also, this readjusting of the first axis can in effect occur by a pivoting of the collectors about a third axis positioned perpendicular to both the first axis and the second axis.

Therefore, the basic purpose of the invention is to produce an apparatus which is as compact as possible, which can be arranged at any desired inclination on a fixed column and with which the collectors can be rotated about two axes which lie perpendicular to one another. Corresponding purposes, for this use, are to provide for very small rotational speed about the axes ($n < 3.10^{-2}$ rpm), and for a high resistance to twisting, and, if desired in a given instance, for self-locking near the axes of rotation.

The purposes of the invention are attained by providing an apparatus in which a first drive mechanism is provided which is stationary and includes a housing, an electric motor, a multi-stage planetary gear set, a spur-gear stage and a driven shaft; and a second drive mechanism is provided which is rotatable by reason of having a housing carried at the free end of the driven shaft of the first drive mechanism, the second drive mechanism further having its own electric motor, multi-stage planetary gear set, spur-gear stage and driven shaft, with the driven shaft of the second drive mechanism being directed perpendicular to the driven shaft of the first drive mechanism and carrying at its ends the aggregates to be rotated. In particular, it is possible with a multi-stage planetary gear set to house a high step-down ratio transmission in a small space. Further, the short elastic length of the planetary gear sets arranged one behind the other provides good resistance to unwanted twisting.

A further development of the invention provides that the two drive mechanisms are built the same but permit different transmission ratios by having different spur-gear stages. The resulting substantial standardization of structural parts limits manufacturing cost to favorable levels. A further development of the invention provides that the two drive mechanisms are built the same but permit different transmission ratios, as through an additional spur-gear stage between the electric motor and multi-stage planetary gear set in at least one of the two drive mechanisms, which again permits standardization of parts and cost advantages.

A further development of the invention provides for incorporation into a slide-in unit of the drive motor, multi-stage planetary gear set and driving gear of the respective spur-gear stage, and if present the additional spur-gear stage, of a given drive mechanism, wherein the slide-in unit is insertable as a unit in the housing of the respective drive mechanism. This makes substantially easier the installation and, if necessary, removal of the drive mechanism of a given shaft.

A further development of the invention provides for eccentric reception of a given slide-in unit into the housing of the respective drive mechanism, which permits substantial achievement of the needed freedom from clearances in the drive train, particularly in the tooth system thereof. Freedom from clearance in the drive train is further enhanced by supporting the shaft in its housing by means of bearings that can be adjusted to a clearance-free condition, for example conical-roller bearings. Clearance-free adjustment of the teeth in the axial direction can be obtained through use of gears having conical teeth.

A further development of the invention provides that the last stage of the planetary gear set is a self-locking Wolfrom gearing, which automatically blocks transmission of motion from its output side to its input side therethrough. This further reduces drive system backlash and at the same time fulfills the demand for self-locking, so as to prevent reverse transmission of motion through the drive train and thus prevent unwanted movement of the aggregate as due, for example, to wind loading.

BRIEF DESCRIPTION OF THE DRAWINGS

The invention will be described in greater detail hereinafter in connection with five figures.

DETAILED DESCRIPTION

Figure 1:
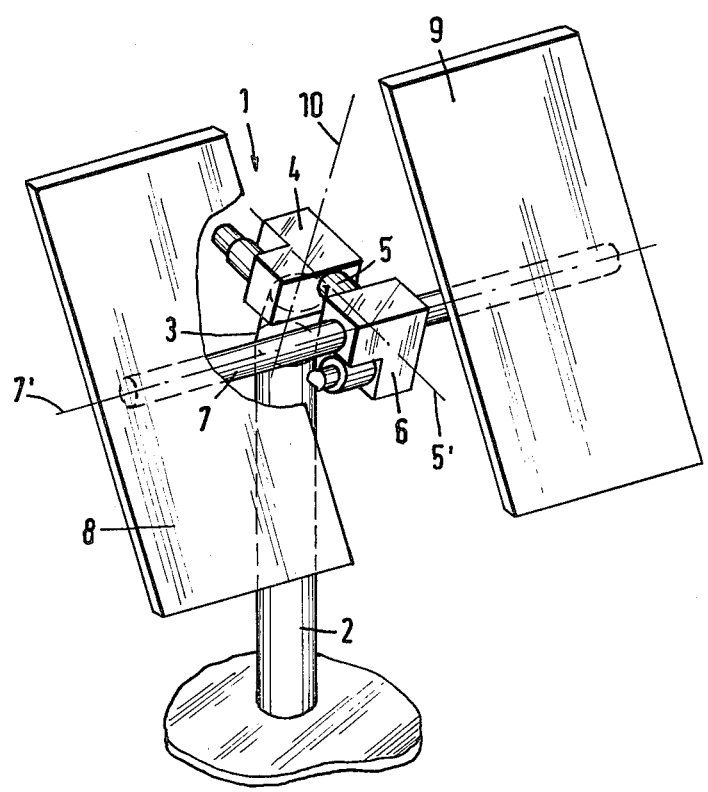
FIG. 1 is a three-dimensional view of an exemplary embodiment of the arrangement of the apparatus with the aggregates which must be rotated.

The principle of the inventive apparatus or its arrangement is illustrated in FIG. 1, where the apparatus is illustrated much simplified as a part composed of geometric elements and is identified by reference numeral 1. The apparatus 1 is arranged on a stationary vertical column 2. An exchangeable adapter 3 interposed between the column 2 and the apparatus 1 permits the inclination of the apparatus 1 to be adjusted to the local conditions. The apparatus 1 has a first drive mechanism 4, which is rigidly secured on the adapter 3. A substantially horizontal shaft 5 is supported rotatably and therefor drivably in the drive mechanism 4, at the free end of which shaft 5 is mounted a second drive mechanism 6. A shaft 7 (elevational axis 7') is supported rotatably and therefor drivably in said driving mechanism 6, at the ends of which shaft 7 are arranged the collectors 8, 9 which are composed of several elements. With the adapter 3, it is possible to arrange the two shafts 5, 7 or their axes 5', 7' in one plane through which the azimuth axis 10 extends at least almost perpendicularly. In this way, constant tracking of the collector is achieved by rotating the collector about the axis 5', while rotative adjustment about the elevational axis 7' is necessary only after a relatively long period of time. This adjustment of the axis 7' is like a changed adjustment of the azimuth axis 10.

The collectors 8, 9 are supposed to be arranged in such a manner that the azimuth axis is positioned perpendicularly with respect to them. Depending on the place on the earth, where the system is set up, and depending on the time of the year, the azimuth axis has a different inclination. The axis 10 is in the example inclined at about the slope of the adapter 3, which can correspond with the medium inclination of the azimuth axis at a certain place. The adjustment to the actual position of the azimuth axis occurs then by a rotation of the collectors 8, 9 about the axis 7'. Thus in FIG. 1 the axis 10 is only at a certain time and at a certain place the true azimuth axis.

Figure 3:
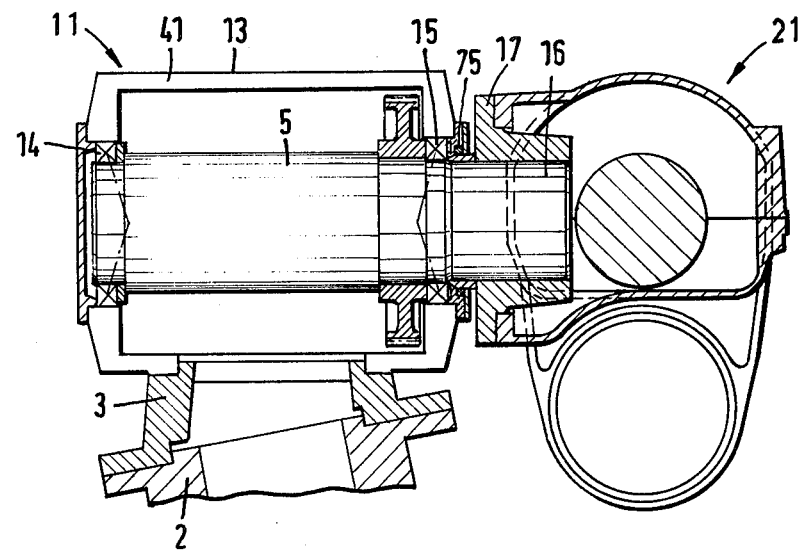
FIG. 3 is a cross-sectional view along the line III—III of FIG. 2.
Figure 2:
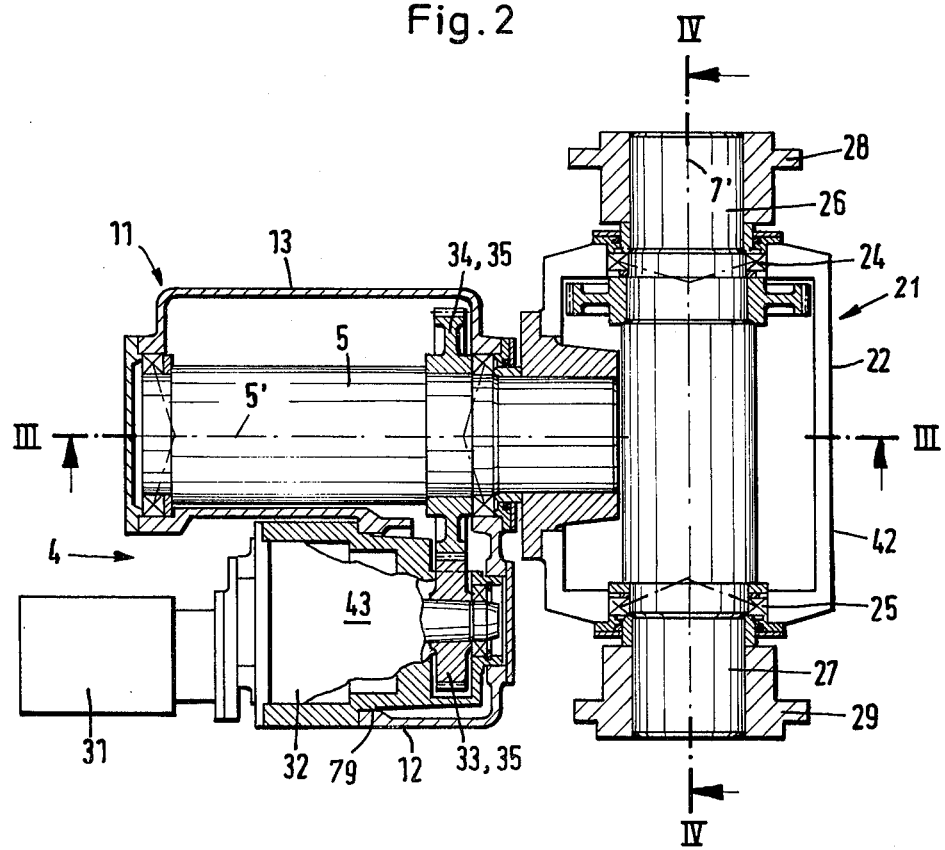
FIG. 2 is a cross-sectional view of the apparatus in the plane of the axes of rotation.
Figure 4:
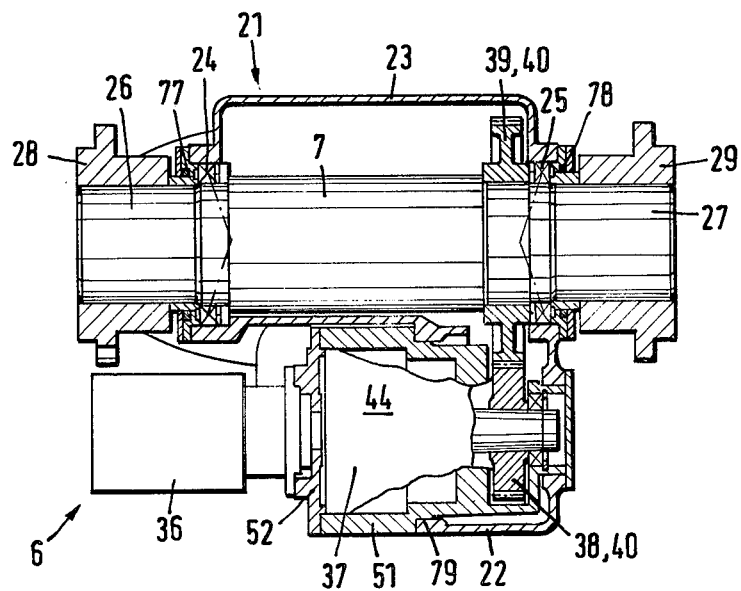
FIG. 4 is a cross-sectional view along the line IV—IV of FIG. 2.

The apparatus 1 is illustrated in three cross sections in FIGS. 2, 3 and 4. A housing 11 is screwed onto the adapter 3, which is fixedly connected to the column 2. To make the mounting easier, the housing is divided into two housing halves 12, 13. The shaft 5 is supported in roller bearings 14, 15 in said housing. The shaft 5 has a free end 16 which extends in a sealed manner outward through the wall of the housing 11 and carries a flange 17. The flange 17 is shrunk on or in any different suitable manner is nonmovably fixed to the shaft for rotation therewith. A housing 21 is screwed onto the flange 17, which housing is divided into two housing halves 22, 23. The shaft 7 is supported in roller bearings 24, 25 in said housing. The ends 26, 27 of the shaft 7 extend in a sealed manner outward through the wall of the housing 21. The ends 26, 27 have fixed thereon flanges 28, 29 on which the collectors 8, 9 are secured. The flanges 28, 29 can be structurally identical to the flange 17.

The two housings 11, 21 are preferably identical in structure for reasons of convenience in manufacture, but this is not a condition for the operation of the invention. The axes 5', 7' of the shafts 5, 7 lie in the planes 41, 42 (FIGS. 2 and 3) of the joints between the housing halves 12, 13 or 22, 23.

To rotate the second drive mechanism 6 about the axis 5', the first drive mechanism 4 is equipped with an electric motor 31, which through a multi-stage planetary gear set 32 (shown in FIG. 2 only in outline) and a spur pinion 33 acts on a spur gear 34 mounted fixedly on the shaft 5 for rotation therewith. Rotation of the spur pinion 33 thus effects rotation of the second drive mechanism 6 about the axis 5'. Spur pinion 33 and spur gear 34 together form a spur-gear stage 35. The electric motor 31, the planetary gear set 32 and the spur pinion 33 will be discussed in greater detail later on.

To rotate the collectors 8, 9 about the axis 7', the second drive mechanism 6 is also equipped with an electric motor, which is identified by reference numeral 36. Motor 36, through a multi-stage planetary gear set 37 (shown only in outline in FIG. 4) and a spur pinion 38, acts on a spur gear 39 mounted fixedly on the shaft 7 for rotation therewith. Spur pinion 38 and spur gear 39 together form a spur-gear stage 40. Rotation of the spur pinion 38 thus effects rotation of the shaft 7 and thus of the collectors 8, 9 about the axis 7'.

The two multi-stage planetary gear sets 32, 37 are also preferably identical in structure, but this also is not a condition for the operation of the invention. If the speed of the two shafts 5 and 7 is supposed to be different, this can be achieved by providing the spur-gear stages 35 and 40 with different transmission ratios.

Figure 5:
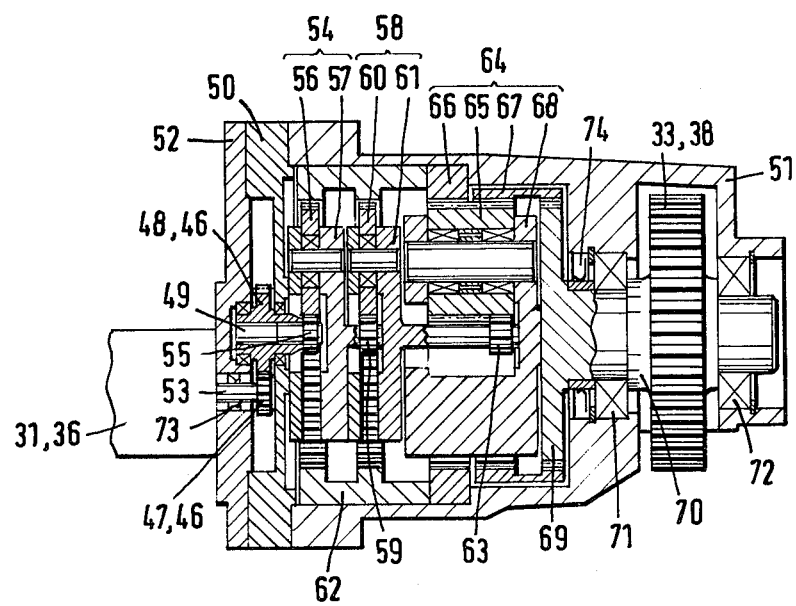
FIG. 5 is a longitudinal cross-sectional view of a slide-in unit.

However, it is also possible to arrange an additional spur-gear stage 46 on a drive mechanism between the electric motor and the planetary gearing, as illustated in FIG. 5. FIG. 5 also illustrates the preferably identical structure of the planetary gear sets 32, 37. An intermediate housing 50 is mounted at its front side on a housing 51 which is formed substantially as a hollow body of rotation. The intermediate housing 50 is closed off by a lid 52. The electric motor 31 or 36 is centered on and secured to said lid. Its driven shaft 53 penetrates through the lid 52 and carries the pinion 47 of the additional spur-gear stage 46. The driven shaft 49 of the spur-gear stage 46 receives both the spur gear 48 and a sun gear 55 of a first planetary gear set 54. When the additional spur-gear stage 46 is not needed, the housing 51 is closed off directly by the lid 52 (FIG. 4) and the driven shaft 53 of the electric motor carries the sun gear 55. Planetary gears 56 and a planetary carrier 57 also are part of the first planetary stage 54. The planetary carrier 57 is connected to the sun gear 59 of a second planetary stage 58 having planetary gears 60 and a planetary carrier 61. Both planetary stages 54, 58 have a common fixed ring gear 62. The planetary carrier 61 is connected to the sun gear 63 of a third planetary stage 64. The sun gear 63 mates with a planetary gear 65, which is in engagement with a fixed ring gear 66 and a rotating ring gear 67. The planetary carrier of the third planetary stage 64 is identified by reference numeral 68. The end 69 of a shaft 70, which end is toothed with the same tooth count is engaged in the tooth system of the ring gear 67. The shaft 70 has mounted fixedly thereon, for rotation therewith, the spur pinion 33 or 38, for example by a shrink fit. It is also possible to design the pinion 33 or 38 and the shaft 70 in one piece and to connect them through a radially toothed coupling to the toothed part 69. The shaft 70 is supported in the housing 51 by roller bearings 71, 72.

The housing 51, together with the motor 31 or 36, the built-in planetary gear sets 32 or 37 and the spur pinion 33 or 38 and possibly the additional spur-gear stage 46, forms a completely mountable slide-in, or plug-in, unit 43 or 44 which can be installed as a whole into the housing 11, 21. The outer surface 79 of the housing 51 is located eccentrically of the central bearing bores within such housing 51 and hence eccentrically of gear 33 or 38. The eccentricity between the axis of the housing outer surface 79 and the axis of the spur pinion 33 or 38 may lie in the range of 0.2 mm. to 0.8 mm. This makes it possible, by a simple rotation, or twisting, of the slide-in units, to adjust the spur-gear pairs 35, 40 into a clearance-free condition.

After the slide-in unit has been rotated (angularly adjusted) to the desired extent, it is then fixed in position in the housing 11 or 21, against unintended further angular displacement, by any conventional holding means, such as a set screw (not shown).

If the driving unit is intended to be self-locking, it is possible to design the third planetary stage 64 as a so-called Wolfrom gearing. The ring gears 66 and 67 then have tooth counts which differ only by one or two teeth from one another. In this manner, a self-locking limit is achieved just in the third stage 64, which self-locking limit acts alternately of the normal forward transmission of power through the gear set 32 or 37. Thus, a reversed power flow from the driven end of the gear set 32 or 37 to its respective motor, as could for example be created by wind loading on the collectors 8, 9, is not possible. Moreover, an almost total elimination of reverse play (freedom from lost motion upon torque reversal) is achieved about the shafts 5, 7 by the spur-gear pairs 35, 40 being adjustable to a clearance-free condition and by the respective planetary stage being self-locking against reverse power flow near the respective driven shaft 5 or 7 so that backlash in the planetary gear stages located therebehind is without effect. This backlash has—due to the type of construction of the gear and the high transmission ratio—at any rate only a small influence on the angles of rotation of the driven shafts.

If one designs the tooth system of the planetary gear set slightly conical, complete freedom from clearance can be achieved by axial adjustment of the gears. All measures to adjust the tooth systems clearance-free would however be incomplete, if the bearings 14, 15 on the shaft 5 and the bearings 24, 25 on the shaft 7 could not also be adjusted clearance-free. Said bearings are therefore designed as conical-roller bearings. Means for clearance-free adjusting of the bearings, for example gauge rings, are known and are therefore not illustrated.

An oil fill is provided in the housing 51 for the fast-running planetary gear sets. Gaskets 73, 74 are provided for this purpose on the shaft passages into the housing 51 and lid 52. Devices needed for filling the housing with oil and for discharging oil from the housing and possibly for oil-level control are known and therefore not illustrated. Grease lubrication is provided in the housings 11, 21 for the slowly running spur-gear pairs 35, 40. Suitable gaskets are provided to protect against the exiting of grease and against the penetration of dirt and moisture, which gaskets on the shaft 5 are identified by reference numeral 75 or on the shaft 7 by reference numerals 77, 78.

The invention is not limited to the described exemplary embodiment. Thus, it is for example possible to exchange the functions of the axes 5' and 7'. Also different uses for the apparatus are contemplated. Therefore, the invention is broadly directed to devices for the independent rotation of an aggregate about two axes which are perpendicular to one another.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus for the rotation of an aggregate independently about two mutually perpendicular axes, in particular for tracking of solar collectors, wherein the improvement comprises: a stationary first drive mechanism having a housing, an electric motor, a multi-stage planetary gear set, a spur-gear stage and a driven shaft; a rotatable second drive mechanism having a housing carried at the free end of said driven shaft of said first drive mechanism, said second drive mechanism further having an electric motor, a multi-stage planetary gear set, a spur-gear stage and a driven shaft, said driven shaft of said second drive mechanism being directed perpendicular to the driven shaft of the first drive mechanism and carrying at its ends the aggregates to be rotated, the last stage of a said planetary gear set being a self-locking Wolfrom gearing, which automatically blocks transmission of motion from output side to input side therethrough.

2. An apparatus according to claim 1, wherein the two drive mechanisms are built the same but permit different transmission ratios by having different spur-gear stages.

3. An apparatus according to claim 1, wherein the two drive mechanisms are built the same but permit different transmission ratios through an additional spur-gear stage between said electric motor and multi-stage planetary gear set in at least one of the two drive mechanisms.

4. An apparatus according to claim 2 or 3, wherein at least in one said drive mechanism the drive motor, the multi-stage planetary gear set, and the driving gear of the respective spur-gear stage are premountable as a slide-in unit on the housing of the respective said drive mechanism.

5. An apparatus according to claim 4, wherein a said slide-in unit is received eccentrically in said housing of the respective drive mechanism.

6. An apparatus according to claim 1, wherein the support of at least one said shaft in its housing is through clearance-free adjustable bearings.

7. An apparatus according to claim 6, wherein said bearings are conical-roller bearings.

8. An apparatus according to claim 1, wherein at least one of said planetary gear sets has gears with conical teeth, which can be adjusted clearance-free in the axial direction.

9. An apparatus according to claim 1, in which said aggregates carried by said driven shaft of said second drive mechanism are solar collectors.

10. An apparatus according to claim 1, wherein in each said drive mechanism said driven shaft is driven through said spur gear stage from the output of said multi-stage planetary gear set, said planetary gear set and driven shaft of each drive mechanism lying close-spaced in their common housing, said driven shaft being supported adjacent its ends at opposite ends of its corresponding housing by bearing means, with at least one end of the driven shaft extending in cantilevered relation beyond the end of its corresponding housing, said driven shaft end of said first drive mechanism being fixed to and extending into the central portion of the housing of said second drive mechanism and into close-spaced axially coplanar relation with the driven shaft of said second drive mechanism, said housing of said second drive mechanism including a flange protruding thereinto and fixed on said extended end of said shaft of said first drive mechanism, said housing of said second drive mechanism including its spur-gear set at one end thereof and one of its bearings at the opposite end thereof with said flange protruding into said housing therebetween, said stationary first drive mechanism being oriented with its driven shaft downwardly angled toward said second drive mechanism on an upstanding fixed member, said planetary gear set of said stationary first drive mechanism being located behind one extended end of said driven shaft of said second drive mechanism, said planetary gear set of said second drive mechanism being located below the housing thereof in spaced relation ahead of said fixed member, so as to provide a compact mounting for tracking of solar collectors.

* * * * *